(12) United States Patent
Nussbaumer et al.

(10) Patent No.: US 9,383,747 B2
(45) Date of Patent: Jul. 5, 2016

(54) PRODUCTION INSTALLATION WITH TIME-INDEXED HISTORICAL DISPLAY

(71) Applicant: Progress Maschinen & Automation AG, Brixen (IT)

(72) Inventors: Erich Nussbaumer, Nals (IT); Richard Michael Hellrigl, Brixen (IT)

(73) Assignee: PROGRESS MASCHINEN & AUTOMATION AG, Brixen (IT)

( * ) Notice: Subject to any disclaimer, the term of this patent is extended or adjusted under 35 U.S.C. 154(b) by 257 days.

(21) Appl. No.: 13/922,551

(22) Filed: Jun. 20, 2013

(65) Prior Publication Data

US 2014/0005821 A1    Jan. 2, 2014

Related U.S. Application Data

(63) Continuation of application No. PCT/IB2011/003227, filed on Dec. 23, 2011.

(30) Foreign Application Priority Data

Jan. 5, 2011    (AT) .................................... A 16/2011

(51) Int. Cl.
*G05B 23/02*    (2006.01)
*G05B 19/418*    (2006.01)
(Continued)

(52) U.S. Cl.
CPC .............. *G05B 23/0272* (2013.01); *B28B 5/04* (2013.01); *B28B 17/0081* (2013.01);
(Continued)

(58) Field of Classification Search
CPC .. G05B 15/00; G05B 15/02; G05B 19/41865; G05B 19/4188; G05B 23/027; G05B 23/0213; G05B 23/0272; G05B 2219/24104; G05B 2219/24209; G05B 2219/25428; G05B 2219/31343; G05B 2219/31449; G05B 2219/31467; G05B 2219/31474; G05B 2219/32085; H04L 41/06; H04L 41/0631; H04L 41/069; H04L 41/22; H04L 67/125; G06Q 10/087; Y10S 715/965; Y10S 715/967

USPC ......... 700/11, 17, 21, 79, 80, 83, 95, 96, 108, 700/109; 702/127, 182; 715/733, 734, 736, 715/764, 771, 772, 810, 835, 839, 961, 965, 715/967; 340/3.1, 3.43, 3.44, 3.7, 3.9, 6.1, 340/8.1, 506, 507, 511, 517, 521, 524, 525
See application file for complete search history.

(56) References Cited

U.S. PATENT DOCUMENTS 3,584,356 A * 6/1971 Joelson .................. B28B 21/765
                                                    425/117
3,719,288 A * 3/1973 Schmitt ................ B65G 1/0435
                                                    198/597

(Continued)

FOREIGN PATENT DOCUMENTS

DE           34 16 028       10/1985
DE     EP 0951955 A2 *  10/1999    .............. B21B 27/20

(Continued)

OTHER PUBLICATIONS

International Search Report (ISR) mailed Jun. 14, 2012 in International (PCT) Application No. PCT/IB2011/003227.

*Primary Examiner* — Crystal J Barnes-Bullock
(74) *Attorney, Agent, or Firm* — Wenderoth, Lind & Ponack, L.L.P.

(57) ABSTRACT

A production installation for the automated manufacture of parts, particularly a pallet circulating installation for the manufacture of reinforced concrete elements and/or an installation for manufacturing reinforcement elements, includes an electronic control computer which is connected to sensors and control elements in the production installation and controls the production sequence. At least one display device is provided for the schematic graphical representation of the production installation and the current state data therefor. A mass memory is provided which can be used to store the state data for the production installation in time-indexed fashion over a period which goes beyond the production time for a part. Also, an electronic computer unit and a display device are provided which can be used to retrieve and graphically display the historical state data stored in the mass memory, together with a schematic graphical representation of the production installation.

24 Claims, 11 Drawing Sheets

(51) Int. Cl.
*B28B 5/04* (2006.01)
*B28B 17/00* (2006.01)
*G01M 15/02* (2006.01)
*G05B 19/409* (2006.01)
*G05B 19/4097* (2006.01)

(52) U.S. Cl.
CPC ............ *G01M 15/02* (2013.01); *G05B 19/409* (2013.01); *G05B 19/4097* (2013.01); *G05B 19/4183* (2013.01); *G05B 19/41865* (2013.01); *G05B 19/41875* (2013.01); *G05B 19/41885* (2013.01); *G05B 2219/31428* (2013.01); *G05B 2219/31467* (2013.01); *Y02P 90/10* (2015.11); *Y02P 90/22* (2015.11); *Y02P 90/26* (2015.11)

(56) References Cited

U.S. PATENT DOCUMENTS

| | | | | |
|---|---|---|---|---|
| 3,927,773 | A * | 12/1975 | Bright | B65G 1/06 414/273 |
| 6,336,053 | B1 * | 1/2002 | Beatty | G05B 19/4188 700/108 |
| 6,396,516 | B1 * | 5/2002 | Beatty | G06Q 10/06 715/734 |
| 6,898,476 | B2 * | 5/2005 | Watanabe | G05B 15/02 345/158 |
| 6,975,966 | B2 * | 12/2005 | Scott | G05B 23/0272 700/4 |
| 7,237,109 | B2 * | 6/2007 | Scott | G05B 19/042 713/164 |
| 7,330,768 | B2 * | 2/2008 | Scott | G05B 23/027 700/21 |
| 7,557,702 | B2 * | 7/2009 | Eryurek | G05B 23/027 340/3.1 |
| 7,676,294 | B2 * | 3/2010 | Baier | G05B 19/41865 340/3.43 |
| 7,793,292 | B2 | 9/2010 | Worek et al. | |
| 8,909,779 | B2 * | 12/2014 | Clair | H04L 67/125 386/326 |
| 2003/0069795 | A1 * | 4/2003 | Boyd | G06Q 10/087 705/22 |
| 2006/0004585 | A1 * | 1/2006 | Shukosky | G06Q 10/06395 705/7.41 |
| 2006/0106684 | A1 * | 5/2006 | Aoki | G06Q 10/087 705/28 |
| 2007/0168068 | A1 * | 7/2007 | Saito | G05B 19/042 700/109 |
| 2008/0066019 | A1 | 3/2008 | Worek et al. | |
| 2008/0103944 | A1 * | 5/2008 | Hagemann | B65D 19/004 705/28 |
| 2008/0191849 | A1 * | 8/2008 | Wakuda | G06Q 10/087 340/10.51 |
| 2009/0088875 | A1 | 4/2009 | Baier et al. | |
| 2009/0164933 | A1 | 6/2009 | Pederson et al. | |
| 2009/0216438 | A1 * | 8/2009 | Shafer | G01C 21/20 701/414 |
| 2009/0288029 | A1 | 11/2009 | Fuller et al. | |
| 2010/0280630 | A1 | 11/2010 | Worek et al. | |
| 2011/0257767 | A1 | 10/2011 | Worek et al. | |

FOREIGN PATENT DOCUMENTS

| | | | |
|---|---|---|---|
| DE | 10 2004 055 413 | 5/2006 | |
| EP | 2 017 049 | 1/2009 | |
| EP | 2 119 542 | 11/2009 | |
| FI | WO 9312918 A1 * | 7/1993 | ............ B28B 1/084 |
| GB | 1390989 A * | 4/1975 | ............ B28B 21/28 |
| IT | WO 2012093282 A1 * | 7/2012 | ............ B28B 5/04 |
| WO | 02/19044 | 3/2002 | |
| WO | 2006/099649 | 9/2006 | |
| WO | 2009/105704 | 8/2009 | |

* cited by examiner

FIG. 4

PRODUCTION INSTALLATION WITH TIME-INDEXED HISTORICAL DISPLAY

BACKGROUND OF THE INVENTION

The invention relates to a production facility for automatically manufacturing parts. In particular, the invention relates to a pallet carousel facility for manufacturing reinforced concrete elements and/or a facility for manufacturing reinforcement elements, having an electronic control computer, which is connected to sensors and control elements of the production facility and which controls the production functional sequence. At least one display device is provided for the schematic graphical representation of the production facility and the current status data thereof.

Production facilities, or pallet carousel facilities, for manufacturing concrete elements are known in principle from, for example, EP 2 119 542 A2, EP 2 017 049 A2 and DE 34 16 028 C2.

In comparison with otherwise conventional production lines, such as, for instance, those known from the automobile industry, most modern prefabricated-part carousels have a characteristic feature that to a large extent influences the entire machine technology: it is not a series of products that are being manufactured, but only single products. Moreover the single products have a very high degree of variability. This presents a particular challenge, both for the machines and for functional sequence organization of the production facility. In particular, procedures or sequences cannot be predefined in a specific manner (so-called "teach-in") but, instead, everything is calculated just-in-time on the basis of the available online data. The machines forming the production facility thus behave as determined by their algorithms on the basis of the part to be produced, and have not been specially set to the prefabricated part to be produced. Likewise, the people working in the production facility must decide just-in-time how to react to a particular situation and how to prioritize their activities.

In the case of highly automated installations, there is the additional difficulty that there can be several initially independent sub-carousels, which have their own functional sequence but which then have to make their component product available in a timely manner at a transfer point. Thus, for example, the reinforcement facility according to FIG. 1 is initially an autonomous part that has its own timing. However, at the "reinforcement transfer" point, the reinforcement must be transferred to the carousel pallet, in such a way that the latter does not have to wait. In order to decouple the timing of the production of such parts, there is usually a small intermediate buffer, but this has only a limited capacity. If this buffer is completely full or completely empty, one of the sub-systems necessarily has to wait. Furthermore, this sub-system problem in itself is not out of the ordinary, but becomes unusually problematic only by the fact that there is no iterative series production, but instead a product sequence that is continuously changing in a fundamental manner.

The above-mentioned single part production (not series production) makes it difficult to make performance analyses. This is because, on the one hand, the production situation is changing continuously, and in a non-reproducible manner. On the other hand, there is also a high degree of mutual influence between the individual products. One and the same product can pass quickly or slowly through the facility, depending on its "compatibility" with the immediately preceding or succeeding products. (This is primarily a matter of full utilization of machinery and personnel; the conventional production-line tasks, aimed at minimizing tool change-over times, are of somewhat secondary importance here).

There can be multiple causes for the performance of such a production facility running well below expectations, for example:

Individual machines are too slow.
Individual machines have too many malfunctions.
Malfunctions are not eliminated sufficiently quickly by personnel (personnel priorities are unfavourable).
Unfavourable travel paths result in parts of the facility mutually interfering (incorrect functional sequence planning).
The personnel do not succeed in completing certain manual operations in a timely manner.
Required supplementary material (built-in components) is not available in a timely manner.
For whatever reasons, the intermediate buffers do not work as originally planned.
The intermediate buffers are too small.
The combination of differing products on one production unit (production pallet) is unfavourable.

The above stated causes for poor performance (and many others) apply in some form or other in the majority of production facilities. In the case of highly automated production facilities, however, it is difficult to ascertain which causes of delay are actually relevant. This is because a malfunction on one machine can be totally irrelevant for the overall production output if, notwithstanding the malfunction, the succeeding intermediate buffer is never empty, or has already been filled up to the maximum capacity again before becoming empty.

Frequently, however, the actual effect of a delay cannot be identified merely through observation of production, since effects can only be assessed at a later point in time and at a different location in the production facility.

A more detailed analysis by digital camera recordings has already been attempted. However, since digital cameras only ever show a portion of the installation, it is scarcely possible to interrelate the multiplicity of information gathered in this way such that relationships actually become identifiable. A greater problem, however, is that camera recordings do not provide sufficient information about a possible cause of stoppage: there is a lack of knowledge about the internal states of the machines involved, and about the enabling and sensor-system signals. Moreover, the relationship to the associated production data can be established only with difficulty.

Another analysis approach is based on detailed tabular records of the cycle times and the faults that have occurred. The cycle-time tables do undoubtedly have a certain informative value when it is a matter of estimating product-related costs. For example, it can be ascertained that, on average, certain product types dwell for longer at manual reworking stations than other product types; such a finding enables certain inferences to be drawn for pricing. However, it is difficult to consider clock-cycle tables, fault tables and other tabular log records in such a joined-up manner that causalities become evident in a quantifiable form.

Overall, therefore, it must be stated that, in the case of highly automated production facilities having a high product variability, all the tools that are currently available are not adequate for rapid understanding of the functional sequence performance, in particular in the case of production facilities having several autonomous sub-regions.

SUMMARY OF THE INVENTION

The object of the present invention therefore consists in creating an improved analysis facility, to enable rapid retroactive identification of delays or bottlenecks in the production sequence. In particular, therefore, it is a matter of the optimization of production.

This object is achieved, for a production facility, in that a mass data storage device is provided, in which the status data of the production facility can be stored in a time-indexed manner over a period that goes beyond the production time for a part. Furthermore, an electronic computer unit and a display device are provided, by which the historical status data stored in the mass data storage device, together with a schematic graphical representation of the production facility, can be retrieved and displayed in graphical form.

The essence of this innovation is the graphical representation of the historical records. For a long time now, control computers of carousel systems have provided analyses in tabular form, listing cycle times and the like. However, the graphical representation of the historical data renders possible an entirely new, significantly improved quality of analysis. This representation indicates relationships and causalities that, in the case of an analysis of tabular data, could be explored only with an unrealistically large resource input.

In other words, this innovation consists in implementing a graphical view of a carousel system that visualizes, not the current state, but a past ("historical") state, and the reference time-point can be selected in an optional manner. This historical representation is particularly useful if it is played back in the manner of a film, either at the original speed or in fast motion. Retroactive viewing of the function sequence allows analysis of when delays occurred. Since enabling signals and similar signals are also displayed, the collateral circumstances of a delay are for the most part rapidly identifiable.

A preferred embodiment of the present invention can provide that the production facility has a multiplicity of cycle stations, at which, respectively, one work operation can be performed in production of the parts, such as concrete or reinforcement elements. It is also possible to provide, as equivalent to the cycle stations, a buffer storage unit or storage stations, in which no actual work operation is performed, but in which a part is nevertheless stored for a certain period of time.

Particularly preferably, it can further be provided that the electronic computer unit is part of the control computer. This means that, in principle, it is not to be precluded that the computer unit is realized so as to be completely separate from the actual control computer, but preferably the computer unit is integrated into the control computer.

This applies in a similar manner to the display device, wherein the current status data can be represented on the same display device as the historical status data.

For the structure and appearance of the graphical history display, there are, of course, innumerable possibilities. It is particularly useful, however, to use substantially exactly the same representation as already used for the ongoing visualization of the current status. Equally, however, it may be necessary and appropriate to use completely differing image structures for the historical and the current representation of the carousel system.

In order to achieve a representation that provides the clearest possible overview and that, for an operator, can be realized as rapidly as possible, preferably, for the representation on the display device, it is possible to select between a current view and a historical view. In the historical view, the schematic graphical representation of the production facility having historical status data corresponds substantially to the schematic graphical representation of the production facility having current status data.

Furthermore, in the historical view, as compared with the current view, the remaining dwell time at the respective cycle station can additionally be displayed for each part in production. Clearly, this is only possible in retroactive viewing, since it is only then that the remaining dwell time can be retrieved and displayed, on the basis of the stored data.

In order to achieve a representation providing an even clearer overview, in the historical view, a field for displaying cycle-station-related and/or parts-related data is displayed, in addition to the representation of the production facility. The representation in this case can be realized such that, as the mouse pointer is being passed over a particular cycle station, the corresponding data changes in the corresponding data field. In principle, in connection with this, it must be pointed out that operation can be effected via a mouse or a keyboard. Another possibility, however, is for the display device to have a touch-sensitive surface.

Of particular importance for ease of switching back and forth between historical time-points, preferably, in the historical view, a field is represented for displaying a time-point that, in respect of time scale, corresponds to the representation of the production facility. A particular advantage is achieved in this case if the time-point display field is part of a play-back field for selectively inputting or selecting a time-point and/or for playing back a plurality of time-points that are preferably separated by equal time intervals.

Obviously, the dwell times of the pallets on the individual cycle stations can be displayed. Besides this, there is additionally the possibility of displaying how much longer a pallet remains stopped after the succeeding cycle station has signalled its readiness to receive the pallet. In actuality, in the historical view it is even possible to display time intervals relating to future events such as, for example, how long it will take until the reinforcement will be ready for a particular pallet.

It is also to be noted that essential analysis knowledge can be obtained just by viewing installation statuses retroactively. In the case of an observed malfunction, for example, it is possible to ascertain rapidly whether this malfunction has affected the production output, by selectively "advancing" the "film" to examine whether the malfunction stoppage could have been compensated for at the succeeding carousel stations. The analysis knowledge obtained in such a manner is helpful in identifying bottlenecks in the production facility that have technical and organizational causes, and in seeking ways of decisively increasing productivity.

In principle, several variants are possible for using the historical view to find faults. Firstly, it is possible simply to specify a particular time-point and to see whether a fault is present at that time-point. Secondly, it is also possible to have a film run over a particular timespan and to watch for fault messages. Thirdly, it is also possible to enter specific faults as search terms, after which the time-points at which such a fault has occurred are output as a search result.

Accordingly, preferably, in the historical view, it is possible to display, for each cycle station or each part, a delay time that corresponds to the dwell time of the part at the cycle station after the enabling signal to proceed to the next cycle station. Such a delay time corresponds to a fault in the production functional sequence. In order to make this fault easily identifiable in the historical view (which can also be called "history view"), preferably the colour representation or highlighting of the cycle station under consideration alters with the display of the delay time.

A further fault can consist in that a particular normal dwell time at a cycle station is assigned substantially to each part. In the case of a dwell time of a part exceeding this normal dwell time, a warning signal can be output, preferably through alteration of the colouring of the cycle station. Such a method is only possible, however, if the normal dwell time has actually been fixed in advance in the production operation for each individual part and if this dwell time is also input into the representation program.

Faults can also occur in the case of storage. In this case, the production facility has at least one buffer storage unit for parts. The degree of fill of the at least one buffer storage unit can be displayed and, if the degree of fill is too low or too high, a warning signal—in the historical view, preferably a graphical warning signal—can be output or displayed.

In order then to obtain an optimum and rapid analysis facility, preferably only in the historical view, past faults such as delay time, dwell-time warning signal and/or buffer storage unit warning signal can be found via a fault search field and can be displayed in a corresponding graphical form.

To enable the graphical "history" representation to be realized, the production functional sequence must be stored in memory, with all necessary details. To enable rapid accessing of this very large quantity of data, one possibility is the use of a relational database. Equally, however, it would also be possible to use list-type text files (log files) or other data storage formats. However, the mere storing of the information does not constitute a material innovation; it is much more a means for the purpose of enabling the graphical representation of the historical progression to be realized.

The graphical performance analyzer (GPA) is a device that concomitantly records all important movements, signals and statuses of a dynamic production line and then reproduces them in a graphical display unit, after processing them in such a way that the causes of production delays and functional sequence bottlenecks are easily identifiable.

The GPA includes, firstly, a very powerful data storage unit, in which all relevant status changes and functional sequences are recorded concomitantly. Here, the movements of the production pallets are recorded, as well as their time-variable link (time indexing) to specific production data. Also likewise registered, however, are all important machine statuses, with their time variation (enabling signals, light barriers, fault states and fault acknowledgements, manual intervention states, and much more).

The data storage unit of the control computer, or GPA, should be implemented such that it can receive a very large quantity of data but, at the same time, can allow very rapid, elective access. It must be possible for the status of a given time-point to be retrieved very rapidly. It must be possible to switch from one time-point to another without disruptive access times. The quantity of data in each case will be considerable, since, in order to achieve satisfactory analysis, at least the progression of the last few days or weeks is required. Ideally, the data storage device should even be able to hold the information from several years.

The second part of the GPA is a graphical display unit, on which the stored data can be displayed, this being in the form of a schematic carousel image that visualizes the status of the installation. Here, it is possible to set any given time-point and thus to see the actual status of this time-point. It is also possible to spool forward and back in the manner of a film, in order thus to view the functional sequence at a settable motion speed.

The essential feature of the GPA display is that it is a graphical representation of historical progressions. In this, on the one hand, a distinction is made from tabular and textual log lists. On the other hand, it is not a simple graphical representation of the actual status, but a representation of the historical progression. The special nature of this display becomes evident if one lists the information that can be displayed so as to provide a clear overview for any given time-point:

a) Position of all production pallets.
b) Data assigned to the production pallets, including all details, however fine, of the associated CAD data.
c) Enabling signal for progression to the individual cycle stations.
d) Statuses of the photoelectric sensors and other relevant sensors.
e) Manual operation statuses of machine parts.
f) Dwell time I: the amount of time a pallet has already spent at a cycle station.
g) Dwell time II: the amount of time for a pallet to progress from the enabling of the succeeding cycle station (this value is much more decisive than dwell time I, since a possible delay can only exist once enabling has been effected).
h) Warning display allowing rapid identification of whether a dwell time has exceeded a presettable limit anywhere in the installation. This function is very important, and it can even be appropriate to incorporate a component making it possible to automatically search for and visualize time-points in which such a warning condition was active.
i) Display of the time interval in relation to any (including future) events. It is thus possible to display, for example, that the reinforcement relating to a pallet in a secondary shuttering will only be ready 15 minutes later; it can then be established whether the personnel are performing the secondary shuttering work as a lower priority.
j) Display of the degree of fill of the intermediate buffer. Here, likewise, it will be useful for completely full and completely empty buffers to have a special visual identification, and for such situations to be systematically traceable by means of special functions.

For realization of the data storage unit of the GPA, it must be taken into account that there is a very large quantity of data, which can be accessed in an unrestricted manner with any time steps. This would suggest the use of a relational database and the realization of random access by corresponding database indices. Good indexing, however, is not sufficient: it is also necessary to find a design that makes it possible to retrieve all information relating to a time-point with just a few access actions, and without the data storage device having an excessive amount of redundancy for this.

The significance of this task becomes clear if it is considered that, in the case of large installations, there can be several status changes per second, wherein the recorded data ideally never has to be deleted, and thus accumulates over years. Despite this quantity of data, it should be possible to effect any given time-point switchover within a few milliseconds, in order, on the one hand, to enable uninterrupted, film-type time-lapse playback and, on the other hand, to make it possible to search rapidly and automatically for "warning statuses" that are to be subsequently analyzed in greater detail.

In principle, the approach using relational databases is only one possibility for technical realization of the data storage unit. Other variants are also conceivable.

For the realization of the graphical display unit, there are clearly many representation options. However, it is particularly useful to seek to achieve a high degree of correspondence with the current carousel display. The current carousel display is a graphical, schematic representation of the actual status of the installation at a given instant. Most control computers have such a functionality, to enable all relevant system statuses to visualized in a manner that provides a clear overview. If the display of the current actual status and the display of the historical progression are then to be harmonized, a double advantage is achieved:

In the GPA, the user has a user interface that is largely compatible with the interface already familiar from the normal installation control system.

The complex configuration work for the graphical representation only has to be performed once; this configuration can then be used both for the current carousel display and for the GPA display.

It may be the case, however, that compatibility between a current display and a GPA display is not always easy to achieve technically. This compatibility is therefore not essential, but simply only one possibility offering particular advantages.

BRIEF DESCRIPTION OF THE INVENTION

Further details and advantages of the present invention are explained in more detail below on the basis of the description of the figures and with reference to the examples represented in the drawings, in which:

FIG. 4 shows a data display field and a time-point display field, and

DETAILED DESCRIPTION OF THE INVENTION

Figure 1:
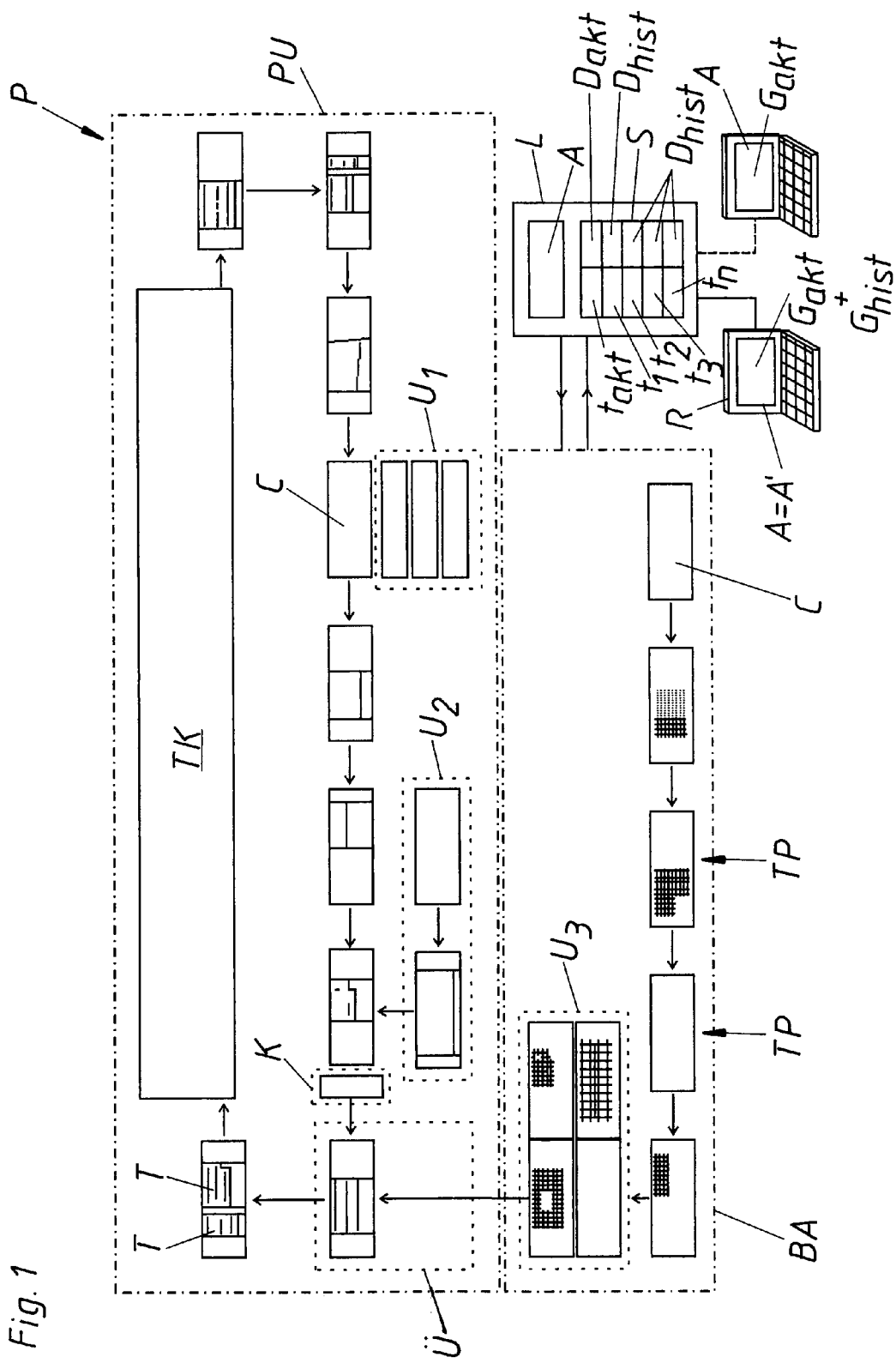
FIG. 1 is a schematic representation of a production facility.

FIG. 1 shows a general view of a production facility P, having a pallet carousel section PU and a reinforcement section BA, for automatically manufacturing parts T, such as mats, lattice beams, concrete elements and the like. The individual parts T in this case are transported on pallets C from the cycle station TP to the cycle station TP. In particular, FIG. 1 shows a pallet carousel section PU for manufacturing reinforced concrete elements and reinforcement elements. In this case, in the upper region PU of the production facility P, the individual shuttering elements are applied to the pallets C, and mutually differing moulds, for subsequent concrete elements, are laid on almost every pallet C. In this pallet carousel installation PU, cleaned carousel pallets C are reserved for rapid access in the buffer station $U_1$. In the buffer station $U_2$, pallets are prepared for the concreting operation.

Shown in the lower region of the production facility P is the reinforcement section BA for manufacturing mats and lattice beams. Reinforcement mats and reinforcement lattices that differ very greatly in their type and form are produced at each cycle station TP, and can be placed in intermediate storage in the buffer storage unit $U_3$. Here, the reinforcements prepared by the reinforcement section BA must be ready in a timely manner.

The reinforcement of the individual carousel pallet C is transferred in the region of the reinforcement transfer station Ü of the production facility P. Concrete prepared by the concrete mixing section must be ready in a timely manner in the concreting station K. After the individual components have been joined together, or "married", the produced parts T are dried in a drying chamber TK.

Disposed in the production facility P as a whole are a very great variety of sensors, or other measuring facilities and control elements, not represented here, for recording sensor data, control data, fault data, etc., wherein all information is forwarded to a control computer L. Conversely, the control computer L can clearly also perform control or regulating operations at the individual cycle stations TP. The control computer L also has a data storage device S, in which the individual data elements D are stored in a time-indexed manner. This data storage device S stores not only the current status data $D_{akt}$, but also the historical status data $D_{hist}$, with the corresponding time-point $t_1$, $t_2$ to $t_n$. In the case of previous embodiments, the current schematic view $G_{akt}$ of the production facility P could be represented by a display device A. This present invention can be used to represent both the current view $G_{akt}$ and the historical view $G_{hist}$ (alternately or next to each other), by the control computer L itself or, preferably, by a separate computer unit R and an associated display device A'.

Figure 2:
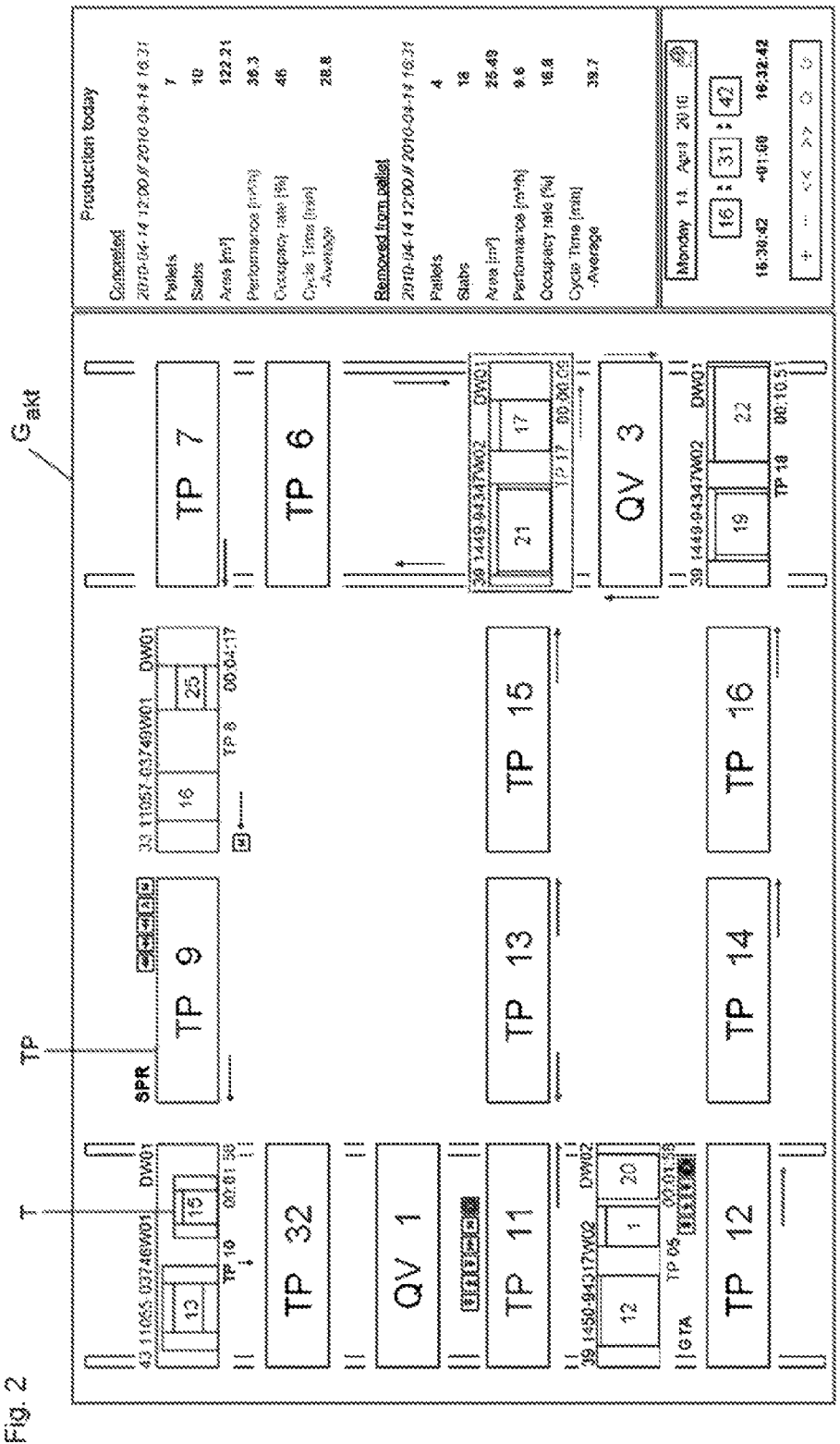
FIG. 2 is a current view represented on a display device.

FIG. 2 shows a current view $G_{akt}$, as already known from previous production facilities and those belonging to the state of the art. In this case, individual cycle stations TP, with the respective parts T in production, are shown in the entire region on the left. The current production status is shown in the region on the right. No further detail of individual points of the representation is provided for this. The graphical carousel representation indicates (typically) the pallets that are currently positioned at the individual carousel cycle stations. In addition, enabling signals for progression to the succeeding station, fault states, photoelectric sensor states, etc. are also usually visualized. However, this graphical representation shows only whether there is a bottleneck somewhere in the carousel system.

Figure 3:
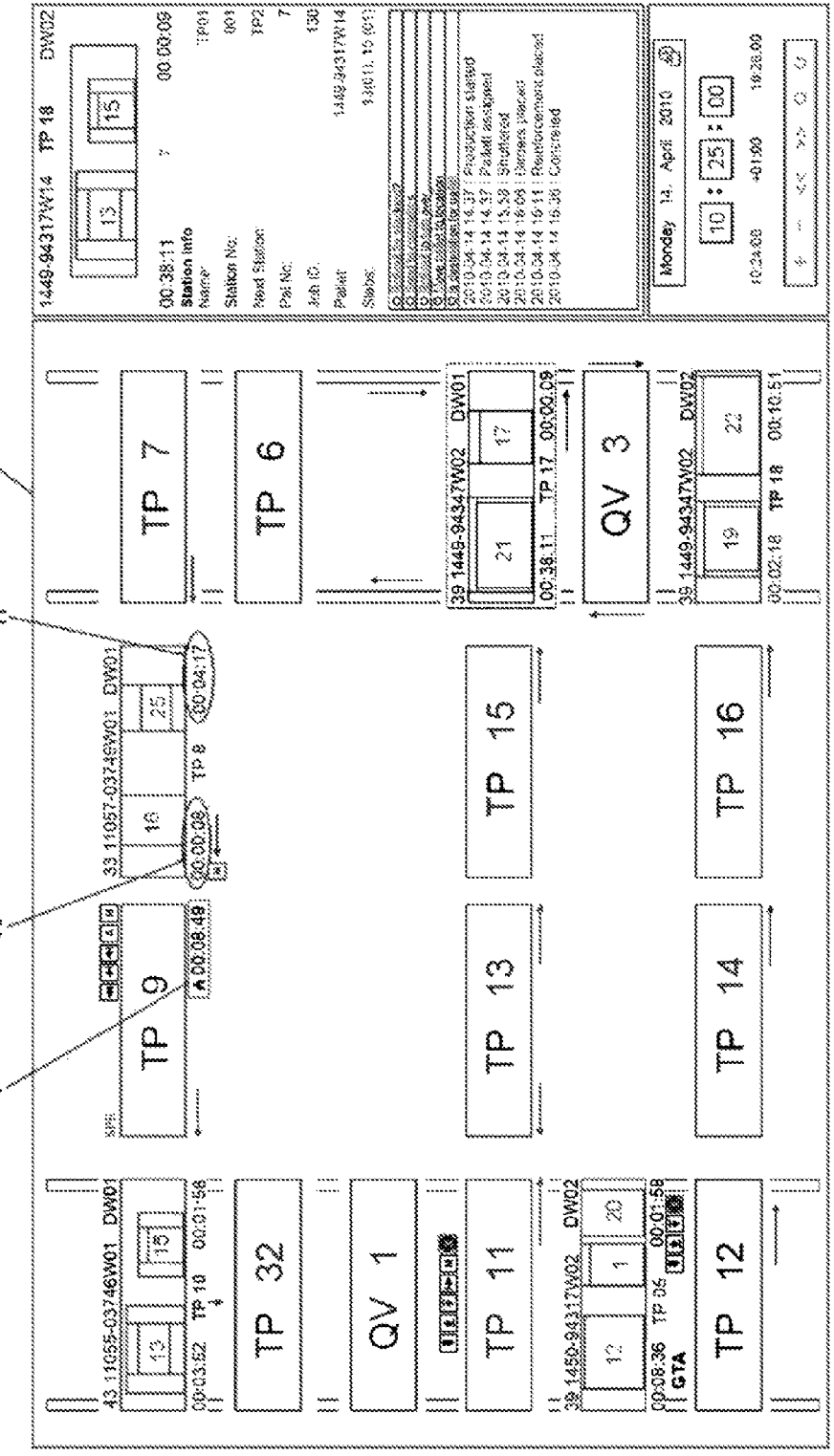
FIG. 3 is a historical view represented on a display device.

By contrast, FIG. 3 shows a historical—i.e. retrospective, and therefore not current—view $G_{hist}$ of the same production facility P. It is evident, as an essential difference, that this view indicates not only the elapsed time H at each cycle station TP, but also the remaining dwell time W of the individual parts T at the cycle station TP. In addition the delay time V can also be seen.

Figure 4:
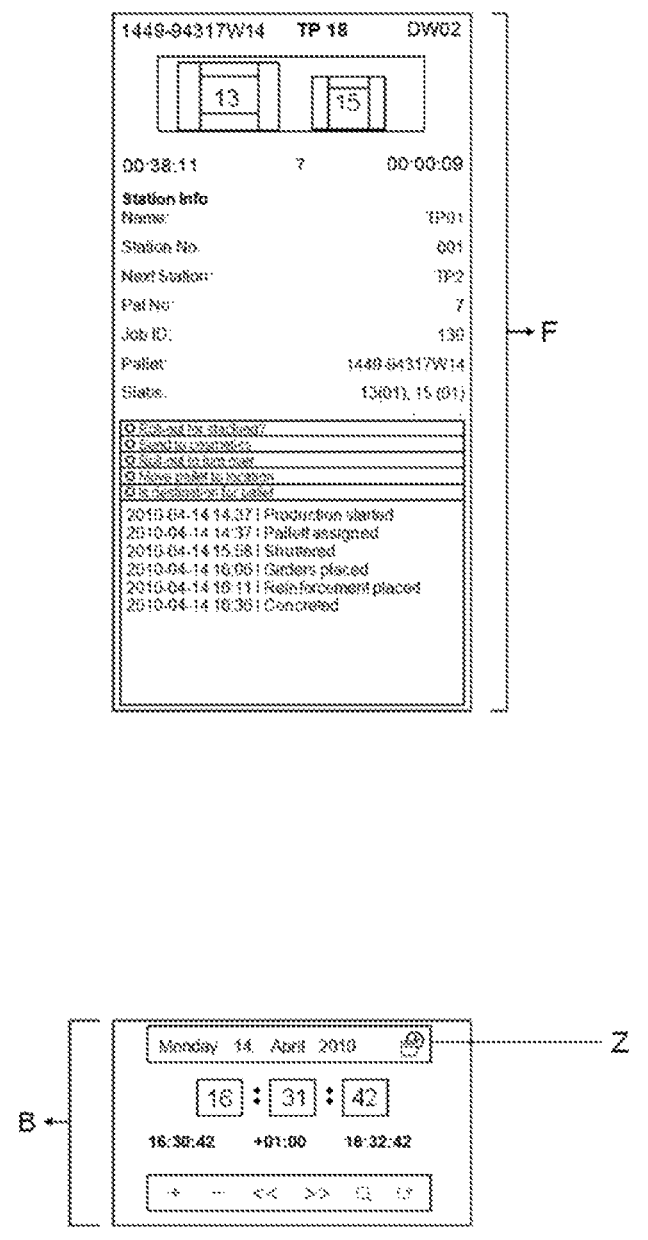

Also represented in FIG. 4 are the additional faults F and B present in the historical view $G_{hist}$, and these faults are preferably displayed next to the schematic graphical representation of the production facility P. In this case, cycle-station-related and/or parts-related data is represented in the display field F. This shows the time-points at which individual work operations were performed on the pallet having the number 7, and that the pallet having the number 7 is currently located at the cycle station 18.

Represented in the lower region is the playback field B, and this playback field also includes a time-point display field Z. In this time-point display field Z, an operator can switch over to any time-points t in the past. The areas located below this can also be used to spool forwards and backwards, and the schematic graphical representation always corresponds with the time-point t in the region on the left, not represented here. For this purpose, clearly, for each time-point t there must exist, or there must be stored in the data storage means S, an information element time-indexed in relation to each individual cycle station TP and to each individual part T.

FIGS. 5 to 11 each show a portion of the historical view $G_{hist}$, with the cycle stations TP8, TP9, TP10 and TP32, wherein the representations show the origin of a bottleneck, or delay. For explanatory purposes, according to FIG. 5, the pallet C having the pallet number 43 is located at the cycle station TP9, and the pallet C having the pallet number 33 is located at the cycle station TP8. The part 13 is located on the pallet number 43, while the part 14 is located on the pallet having the number 33. On the right, below the representation, one can read off the elapsed dwell time H of the part 13, or of the pallet 43, at the cycle station 9, while the remaining dwell time W is shown on the left side. The number column to the right of the pallet number corresponds to element-specific data E. Represented above this element data E, at the cycle station 9, are the discharge enabling signal AF and the intake enabling signal EF, wherein these enabling signals can be effected either manually (M), by employees working at the cycle station, or automatically (A). When the enabling signal has been effected, the transport arrow X is represented, and transport can be effected by conveyor belts, or also by transverse transfer devices Q.

Figure 5:
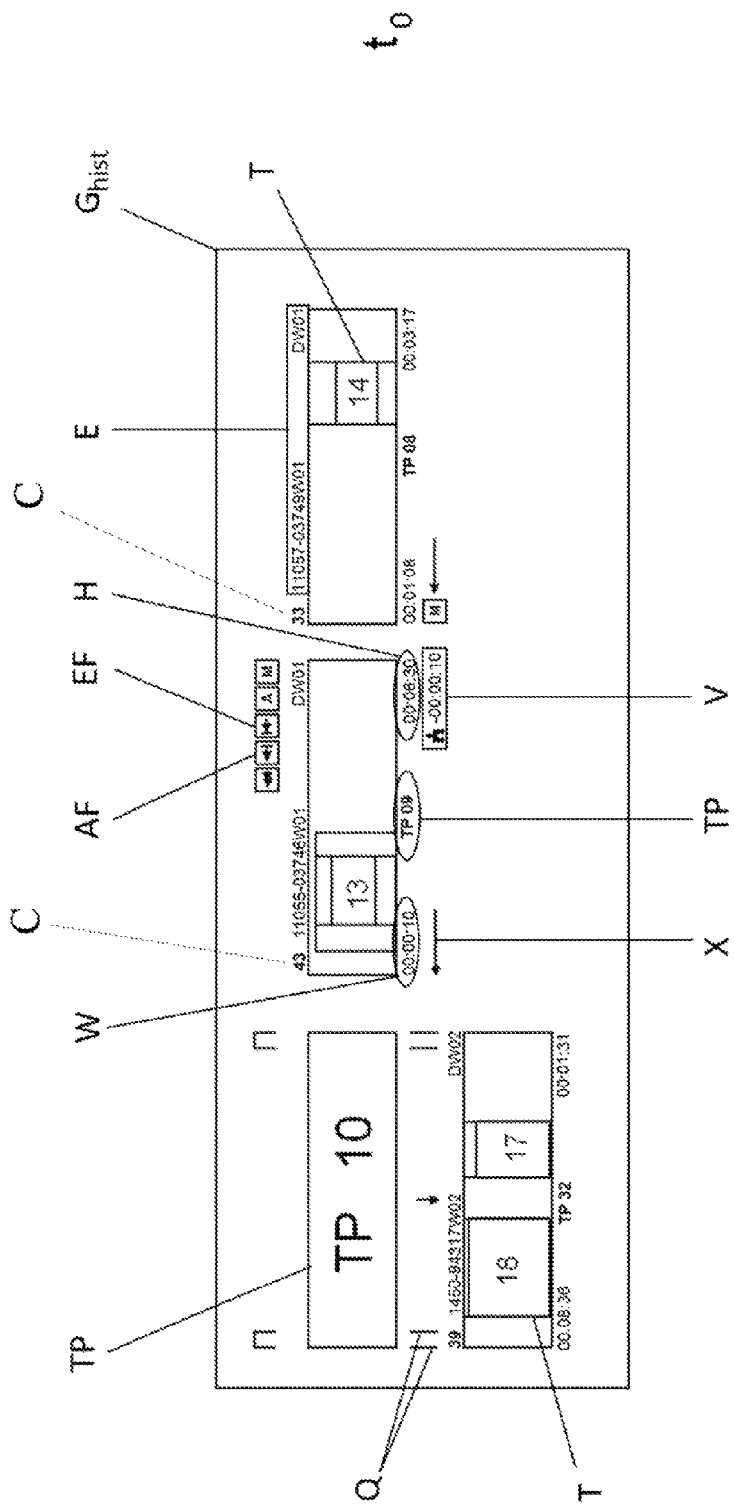
FIG. 5 to FIG. 11 shows the origin and historical analysis of a delay.
Figure 6:
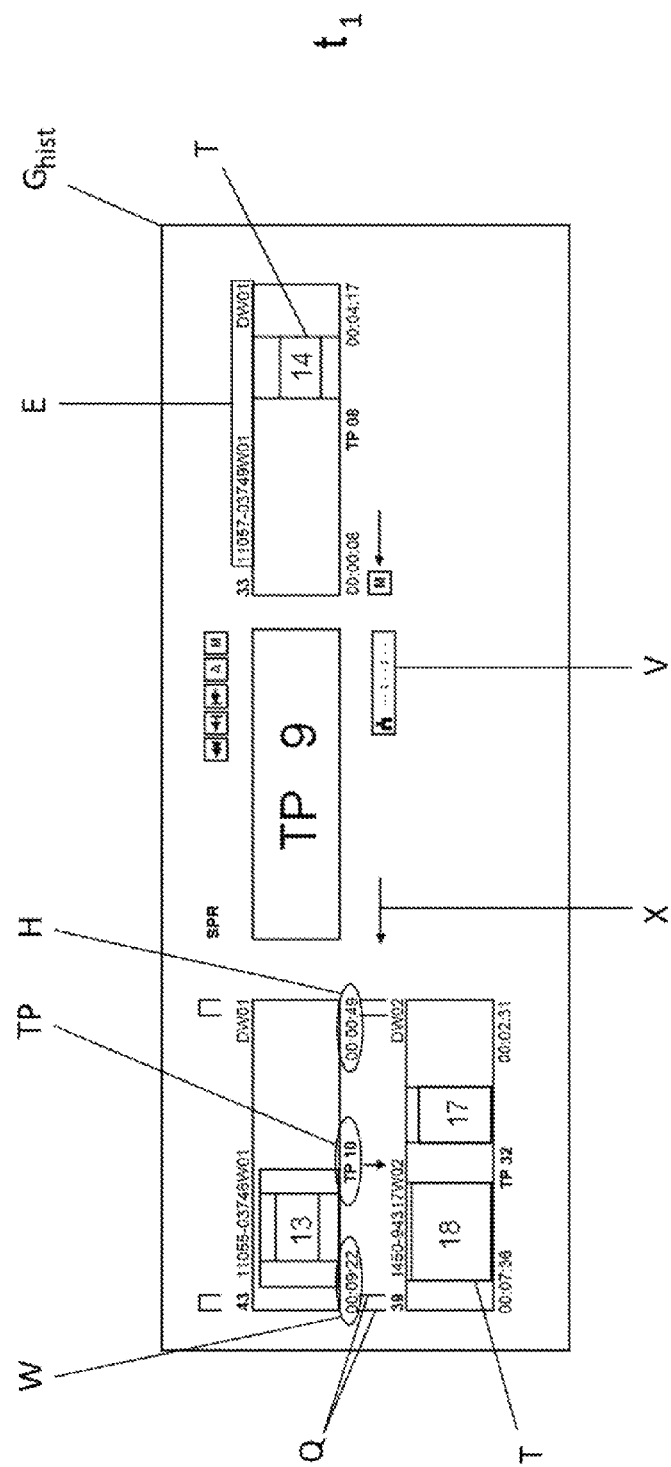

In comparison with the time-point $t_0$ represented in FIG. 5, FIG. 6 shows the time-point $t_1$, which corresponds to the graphical representation of one minute after the time-point $t_0$. It can be seen in this FIG. 6 that the pallet 43 has been standing at the current cycle station TP10 for 49 seconds. On the left, below the cycle station, it is shown that the pallet will remain at this location for a further 9 minutes and 22 seconds. This information is in principle only available through retrospective viewing of the functional sequence (historical view $G_{hist}$). Since the total dwell time of over 10 minutes is too long for the cycle station TP10 concerned, the values are represented, for example, in red. The cycle station can also be highlighted in red. Other signal colors or other ways of highlighting are obviously also possible. If such a situation occurs during retrospective viewing, it is therefore useful to examine the functional sequence further in order to determine why the long dwell time has occurred.

Figure 7:
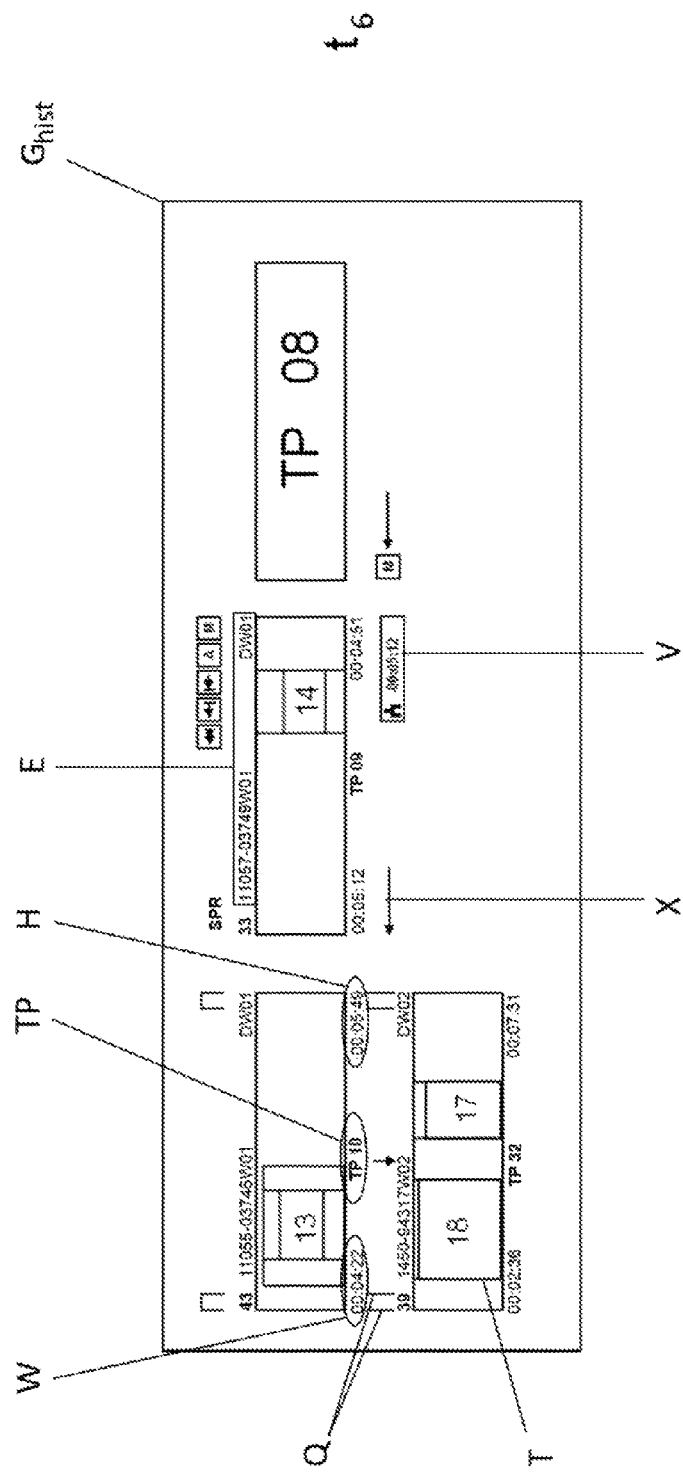

It can be seen in FIG. 7 that the pallet C having the number 33 has already advanced to the cycle station TP9, and this pallet has now already had the enabling signal for progression for a long time. At this time-point $t_6$ (which corresponds to 6 minutes after time-point $t_0$) it is already evident that the pallet 33 still has a delay time V of 5 minutes and 12 seconds until it is transferred.

Figure 8:
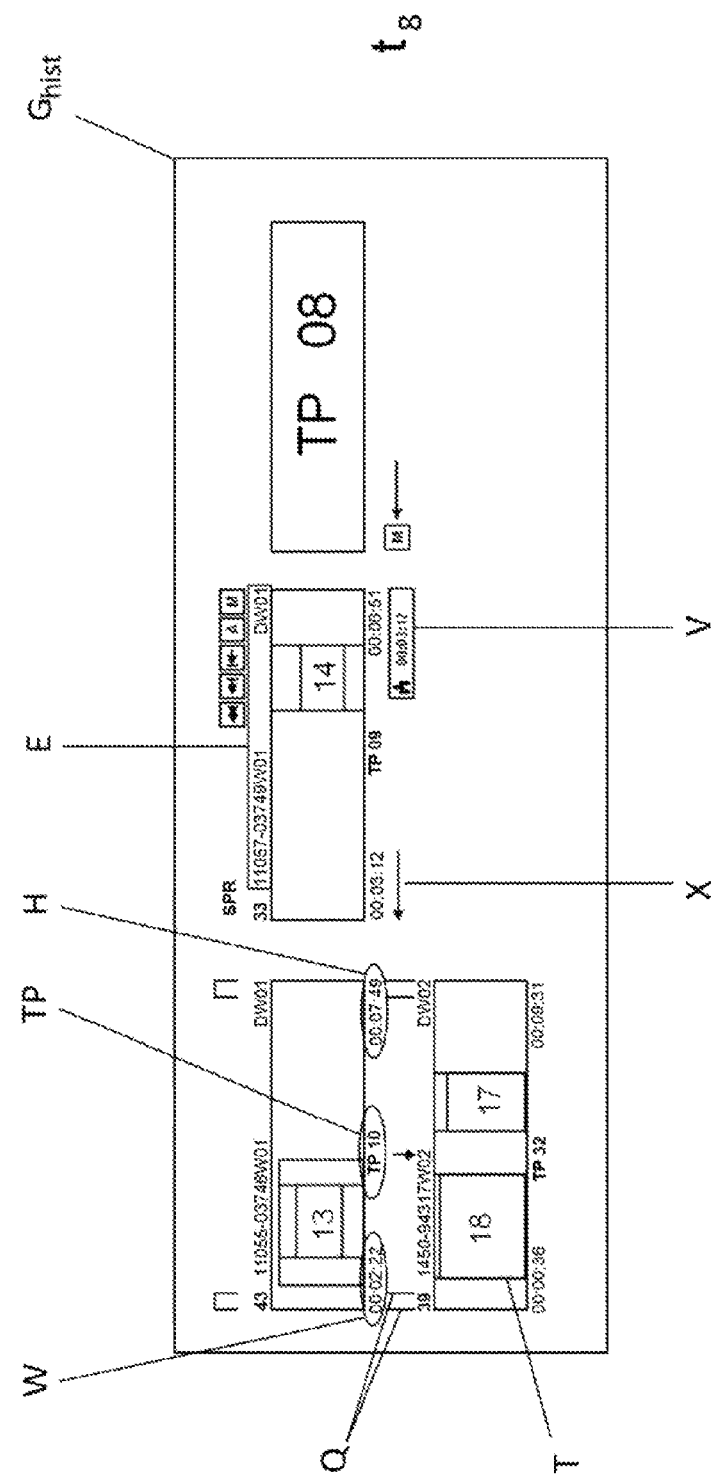

In FIG. 8, the same situation can still be seen, at the time-point $t_8$, 2 minutes later.

Figure 9:
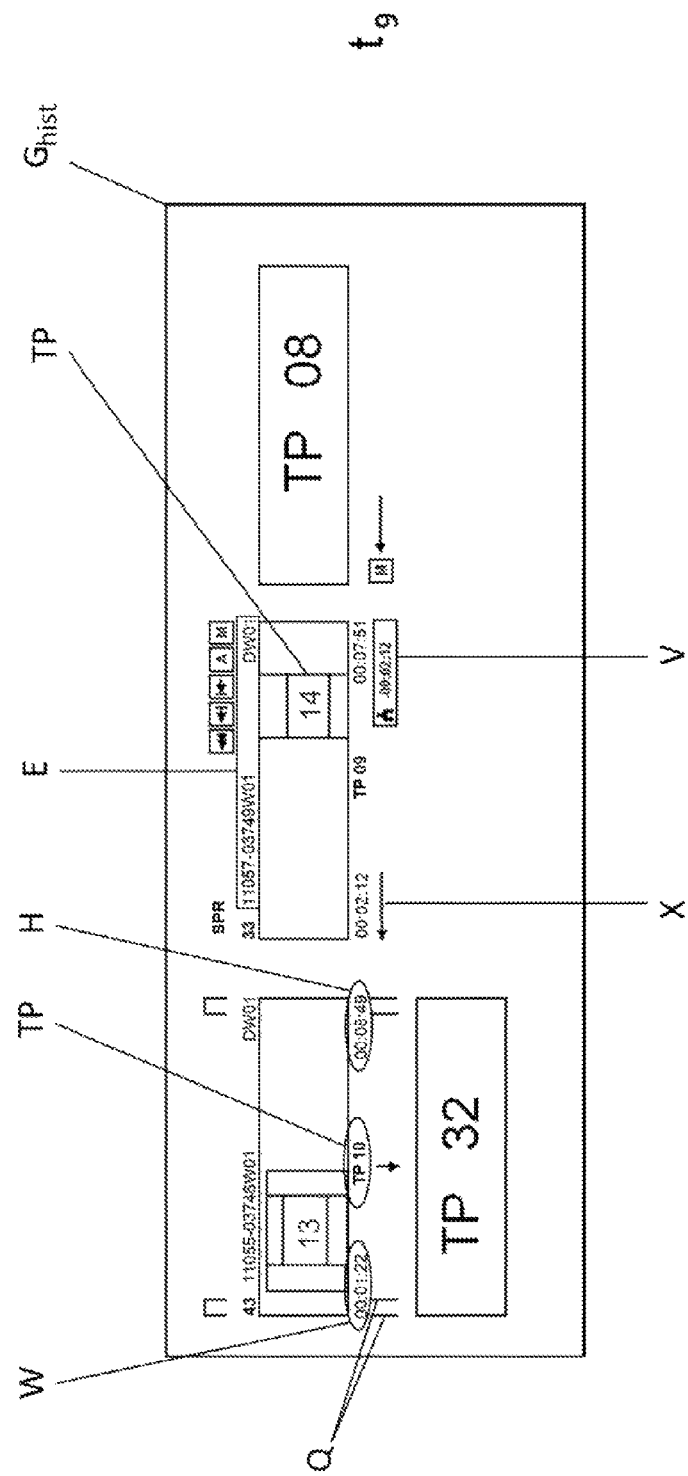
Figure 10:
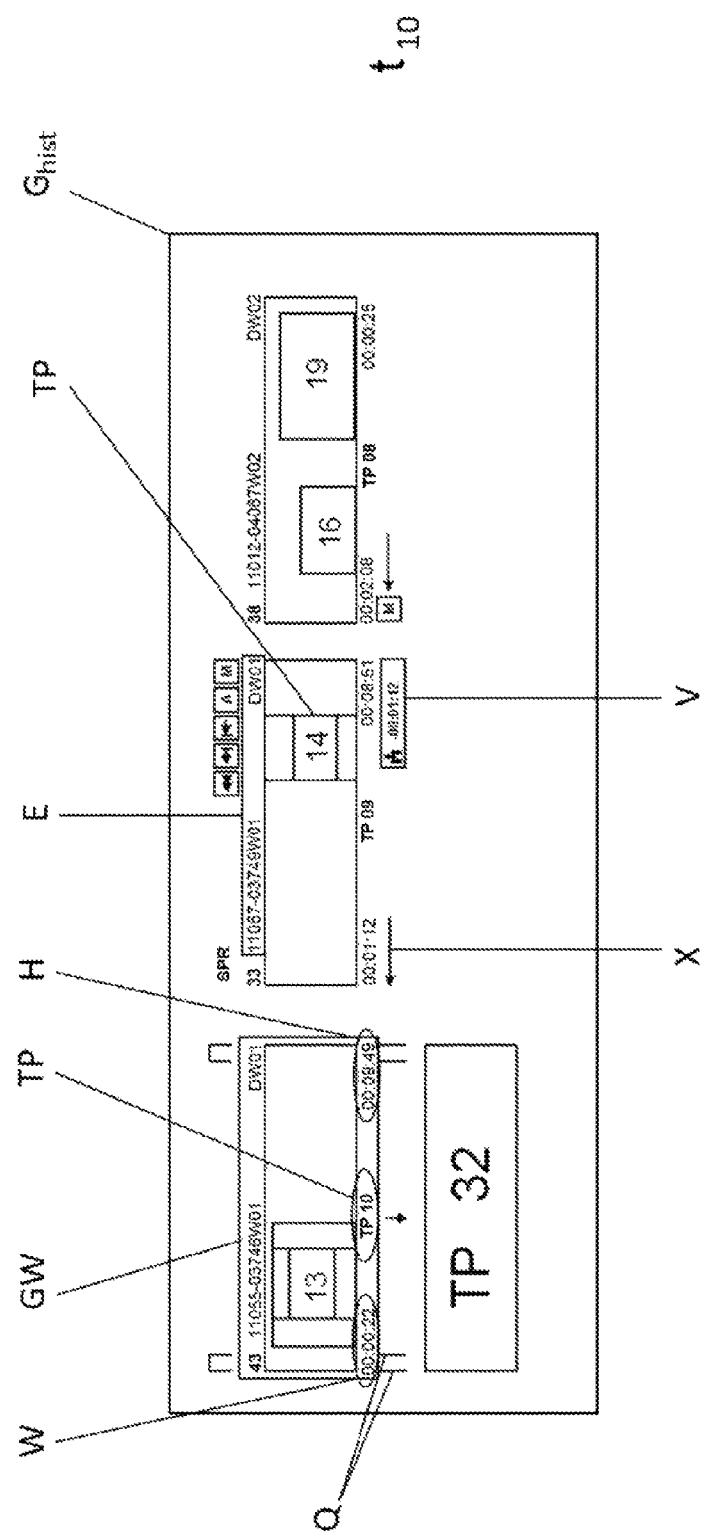

By contrast, it can be seen in FIG. 9, at the time-point $t_9$, that the cycle station 32 is already free again, but the pallet 43 nevertheless remains at the cycle station 10. Consequently, the bottleneck situation at the cycle station 9 depends, not on the cycle station TP32, but rather on the cycle station TP10. The long dwell time of the pallet 43 is thus not a consequence of a bottleneck, but is caused directly by excessively long processing at the station in question. The station is therefore initially marked with an orange rectangular warning border.

Depending on the time delay, differing color values, e.g. orange or red, can also be used to better represent time overruns of differing length. For this reason, in FIG. 10, the cycle station 10 is highlighted in red (graphical warning signal GW) at the time-point $t_{10}$, and an analysis must consider in detail why the delay occurred.

Figure 11:
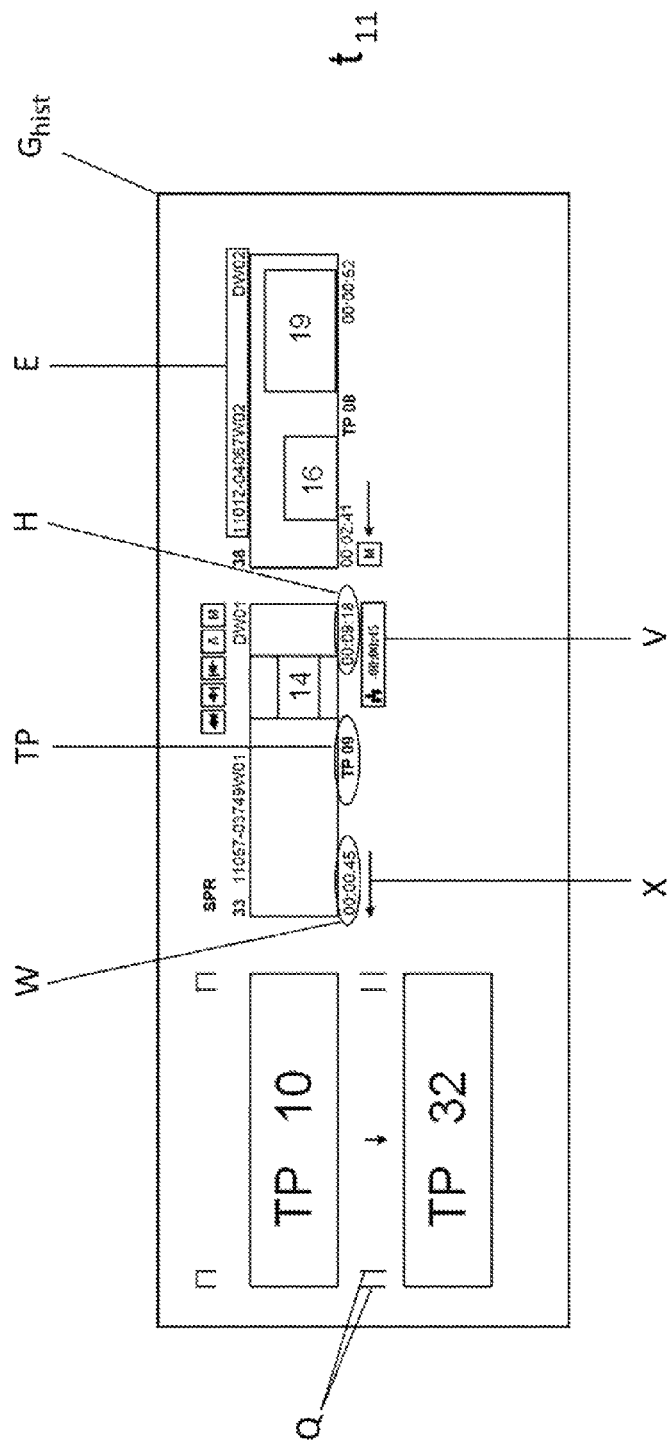

Finally, also represented in FIG. 11 is the time-point $t_{11}$, at which the pallet 43 was transported on from the cycle station TP10, but, due to preparation work at the cycle station 10, the pallet 33 still has to wait for a short waiting period of 45 seconds until it is transported on to the cycle station TP10.

The invention claimed is:

1. A production facility for automatically manufacturing parts, comprising:
    a pallet carousel section for manufacturing reinforced concrete parts on pallets, said pallet carousel facility being configured to form a differently-formed one of the concrete parts on each of at least half of said pallets of said pallet carousel facility;
    a reinforcement section for manufacturing reinforcement parts having different forms;
    sensors and control elements;
    an electronic control computer connected to said sensors and control elements and configured to control a production functional sequence;
    a first display device for schematically graphically representing said production facility and for schematically graphically representing current status data of said production facility;
    a mass data storage device for storing status data of said production facility in a time-indexed manner over a period of time extending beyond a production time for any one of the parts, the status data comprising data assigned to said pallets of said pallet carousel facility including CAD data; and
    an electronic computer unit and a second display device for retrieving and displaying historical status data stored in said mass data storage device, together with a schematic graphical representation of said production facility.

2. The production facility according to claim 1, wherein said pallet carousel section and said reinforcement section include a plurality of cycle stations, each of said cycle stations being configured to perform one work operation in producing the parts.

3. The production facility according to claim 2, wherein a normal dwell time at each of said cycle stations is assigned to each of the parts, said first electronic control computer being configured to, if an actual dwell time of any one of the parts exceeds the respective normal dwell time, output a warning signal.

4. The production facility according to claim 3, wherein said first electronic control computer is configured to output the warning signal through alteration of a manner of representation of the respective one of the cycle stations.

5. The production facility according to claim 1, wherein said electronic computer unit is part of said electronic control computer.

6. The production facility according to claim 1, wherein said electronic control computer, said electronic computer unit, said first display device, and said second display device are configured to display in graphical form in a historical view a schematic graphical representation of said production facility and at least one of a current view of a production facility representation and the historical status data stored in said mass data storage device.

7. The production facility according to claim 6, wherein said electronic control computer, said electronic computer unit, said first display device, and said second display device are further configured to allow a toggle between the current view and the historical view.

8. The production facility according to claim 6, wherein said electronic control computer, said electronic computer unit, said first display device, and said second display device are further configured such that, in the historical view, the schematic graphical representation of said production facility having historical status data corresponds substantially to the schematic graphical representation of the production facility having current status data.

9. The production facility according to claim 6, wherein said electronic control computer, said electronic computer unit, said first display device, and said second display device are further configured to display, in the historical view, a remaining dwell time at the respective cycle station for each of the parts during production.

10. The production facility according to claim 6, wherein said electronic control computer, said electronic computer unit, said first display device, and said second display device are further configured to display, in the historical view, the representation of the production facility and at least one of a field for displaying cycle-station-related data and a field for displaying parts-related data.

11. The production facility according to claim 6, wherein said electronic control computer, said electronic computer unit, said first display device, and said second display device are further configured to display, in the historical view, a time-point display field corresponding to the representation of the production facility in respect of time scale.

12. The production facility according to claim 11, wherein said time-point display field is part of a play-back field for performing at least one of (i) a selective input or selection of a time-point and (ii) a play back of a plurality of time-points.

13. The production facility according to claim 12, wherein said time-point display field is part of a play-back field for performing a play back of a film of a plurality of time-points, the time-points being separated by equal time intervals.

14. The production facility according to claim 6, wherein said electronic control computer, said electronic computer unit, said first display device, and said second display device are further configured to display, in the historical view, a delay time corresponding to a dwell time of each of the parts at a corresponding one of a plurality of cycle stations after issuance of a signal for the parts to proceed to a subsequent one of said cycle stations.

15. The production facility according to claim 14, wherein said electronic control computer, said electronic computer unit, said first display device, and said second display device are further configured to alter a color representation or highlighting of said cycle stations with the display of the delay time.

16. The production facility according to claim 14, wherein said electronic control computer, said electronic computer unit, said first display device, and said second display device are configured to find past faults via a fault search field, and are configured to display the past faults in a corresponding graphical form.

17. The production facility according to claim 16, wherein said electronic control computer, said electronic computer unit, said first display device, and said second display device are configured to find and display the past faults only in the historical view, the past faults including at least one of the delay time, a dwell-time warning signal, and a buffer storage device warning signal.

18. The production facility according to claim 6, wherein said electronic control computer, said electronic computer unit, said first display device, and said second display device are configured to, in the historical view, play back or display as a film a plurality of time-points of the historical view of the schematic graphical representation of said production facility.

19. The production facility according to claim 18, wherein said electronic control computer, said electronic computer unit, said first display device, and said second display device are configured to, in the historical view, play back or display as a film the plurality of time-points separated by equal intervals.

20. The production facility according to claim 6, wherein said electronic control computer, said electronic computer unit, said first display device, and said second display device are configured to display the current view and the historical view alternately or next to each other on the same one of said first display device and said second display device.

21. The production facility according to claim 1, further comprising a buffer storage device for storing the parts, wherein said electronic control computer, said electronic computer unit, said first display device, and said second display device are configured to display a degree of fill of said buffer storage device and output or display in a historical view a warning signal if the degree of fill is too low or too high.

22. The production facility according to claim 1, wherein said electronic control computer, said electronic computer unit, said first display device, and said second display device are configured to display the current status data and the historical status data one the same one of said first display device and said second display device.

23. A production facility for automatically manufacturing parts, comprising at least one of (i) a pallet carousel facility for manufacturing reinforced concrete elements and (ii) a reinforcement production facility for manufacturing reinforcement elements, said production facility including:
   an electronic control computer connected to sensors and control elements and configured to control a production functional sequence,
   a first display device for schematic graphical representation of said production facility and a current status data thereof,
   a mass data storage device for storing a status data of said production facility in a time-indexed manner over a period of time beyond a production time for the parts, and
   an electronic computer unit and a second display device for retrieving and displaying in graphical form historical status data stored in said mass data storage device, together with a schematic graphical representation of said production facility,
   wherein said electronic control computer, said electronic computer unit, said first display device, and said second display device are configured to display in graphical form in a historical view a schematic graphical representation of said production facility and at least one of a current view of a production facility representation and the historical status data stored in said mass data storage device, and
   wherein said electronic control computer, said electronic computer unit, said first display device, and said second display device are further configured to display, in the historical view, a delay time corresponding to a dwell time of each of the parts at a corresponding one of a plurality of cycle stations after issuance of a signal for the parts to proceed to a subsequent one of said cycle stations.

24. A production facility for automatically manufacturing parts, comprising at least one of (i) a pallet carousel facility for manufacturing reinforced concrete elements and (ii) a reinforcement production facility for manufacturing reinforcement elements, said production facility including:
   an electronic control computer connected to sensors and control elements and configured to control a production functional sequence,
   a first display device for schematic graphical representation of said production facility and a current status data thereof,
   a mass data storage device for storing a status data of said production facility in a time-indexed manner over a period of time beyond a production time for the parts, and
   an electronic computer unit and a second display device for retrieving and displaying in graphical form historical status data stored in said mass data storage device, together with a schematic graphical representation of said production facility, wherein said electronic control computer, said electronic computer unit, said first display device, and said second display device are configured to display in graphical form in a historical view a schematic graphical representation of said production facility and at least one of a current view of a production facility representation and the historical status data stored in said mass data storage device, and wherein said electronic control computer, said electronic computer unit, said first display device, and said second display device are configured to, in the historical view, play back or display as a film a plurality of time-points of the historical view of the schematic graphical representation of said production facility.

* * * * *